United States Patent [19]
Bruel

[11] 3,939,629
[45] Feb. 24, 1976

[54] TRANSVERSE BEATING DEVICE FOR A GRAPE-GATHERING MACHINE

[76] Inventor: Alain Bruel, Domaine du Petit Chaumont, Alques-Mortes (Gard), France

[22] Filed: July 26, 1973

[21] Appl. No.: 383,015

[30] Foreign Application Priority Data
Jan. 10, 1973 France .............................. 73.01356

[52] U.S. Cl. ................................................ 56/330
[51] Int. Cl.² ......................................... A01D 46/00
[58] Field of Search ......... 56/330, 331, 327, 28, 29, 56/13.5, 12.4, 33, 34, 35

[56] References Cited
UNITED STATES PATENTS
| | | | |
|---|---|---|---|
| 3,611,689 | 10/1971 | Patzlaff | 56/330 |
| 3,727,388 | 4/1973 | Smith | 56/330 |
| 3,774,381 | 11/1973 | Burton | 56/330 |

*Primary Examiner*—Russell R. Kinsey
*Attorney, Agent, or Firm*—Sughrue, Rothwell, Mion, Zinn & Macpeak

[57] ABSTRACT

The invention relates to a beating mechanism for grape-gathering operations.

Two beaters (5) and (6), disposed opposite each other, and constituted by whips (8), are imparted transverse motions defined by the throws of two cam members (10) and (17) of a beating mechanism. The motions, which have identical periods, differ in phase on two opposite beaters. The mean spacing between the points (9) is at a maximum; said spacing varies according to a law, in order to avoid breaking the branches, while ensuring that the grapes are duly taken down.

4 Claims, 14 Drawing Figures

Fig.1

Fig_2

TRANSVERSE BEATING DEVICE FOR A GRAPE-GATHERING MACHINE

FIELD OF INVENTION

The invention relates to a beating mechanism for gathering grapes, and to the beater kinematics.

DESCRIPTION OF PRIOR ART

The grape-gathering machines of known type are provided with two series of beater members disposed on either side of the row of vines concerned. When the machine moves forward, the beater supporting plates are imparted a transverse motion to transmit to the grapes a speed which, at the end of the motion, generates a force which tears the clusters of grapes away from the vine. Most of times, the beater members comprise whips constituted by vertical rows of horizontal rods, each of said rods being fixed to a supporting plate, while its free end or point acts upon the vine for taking off the grapes. In the beater devices of the known machines, the spacing between two opposite points remains substantially constant during the whole motion of the beater members. Such devices have the following drawbacks:

the adjustment of the spacing is difficult when passing from one row of vines to another;

when the points of the rods are very close to each other, the transverse speed gained by the grapes is nearly equal to that of the beater member, and generates a tearing force which duly detaches the grapes but many leaves as well, while, when the machine moves forward, the rods of the beater member pluck off the leaves and break the shoots;

when the spacing between the points is large, the vine is subjected to fewer injuries, but the foliage damps the tearing force substantially at the end of the motion, so that the percentage of clusters detached becomes low.

SUMMARY OF THE INVENTION

The object of the invention is to provide a beating device which ensures a variable spacing between the points of the rods of the beater member during the motion of the machine. Said device is adapted, besides, to be fitted to the machines of known types.

A device according to the invention includes at least two beaters disposed opposite each other on either side of a row of vines, each beater constituted by a series of vertically superposed horizontal rods or whips, one of the ends of each rod being integral with a whip-carrying plate while the other end directed towards the row of vines if free. Each beater is integral with a bearing in which a first eccentric having a vertical axis runs. Said beater is linked to one end of a connecting rod in which a second eccentric having a vertical axis runs, so that the vertical whip-carrying plate of the beater moves in a horizontal motion of translation and rotation, the speed of which is variable, and which is out of step with respect to the similar motion of the beater disposed oppositely on the other side of the row of vines. The spacing between a point on a beater and an opposite point on the other beater at a maximum during the major portion of the motion, while it decreases at a high speed at the end of each transverse motion.

According to another feature of the invention, the first eccentric has a diameter equal to half that of the second eccentric and is rotated at twice the speed and in the same direction as the second eccentric.

According to another feature of the invention, the eccentrics are rotated at a constant speed, so that the operating cycle is divided into four stages:

a quarter of a period during which the beater does not rotate;

a quarter of a period during which the beater acts as an accelerator at a high speed, owing to the opposite motions of the eccentrics;

a third quarter of a period during back the beater comes back towards its initial position very quickly, while moving away from the row of vine stocks;

a fourth quarter of a period during which the beater does not rotate and acts as a stopper in regard to the opposite beater.

According to the invention, the eccentrics of the two opposite beaters are identical with one another, while the motions thereof differ by half a period, so that each beater acts in turn as an accelerator or as a stopper, while the opposite beater is in turn a stopper or an accelerator. A modification consists in connecting the two beaters each to two eccentrics, in which the strokes of one of the eccentrics are less than the strokes of the corresponding eccentrics of the opposite beater.

The amplitude of the translation of the first eccentric is slightly greater than half the amplitude of the translation of the second eccentric, so that the horizontal transverse motion of a beater always takes place in four stages. The translatory motions are accompanied by a slight rotation of the beaters. The movements of the beaters are out of step with respect to each other, and may be symmetrical or asymmetrical with respect to the row of vines, depending on whether it is desired to collect the clusters of grapes on both sides of the plants or on one side only.

The periods of the motions of the two beaters disposed opposite each other are identical, both when the device is symmetrical and when it is asymmetrical.

BRIEF DESCRIPTION OF THE DRAWINGS

The accompanying drawing, which is given by way of a non-limiting example, will allow understanding the features of the invention more clearly.

DETAILED DESCRIPTION OF PREFERRED EMBODIMENT

Figure 1:
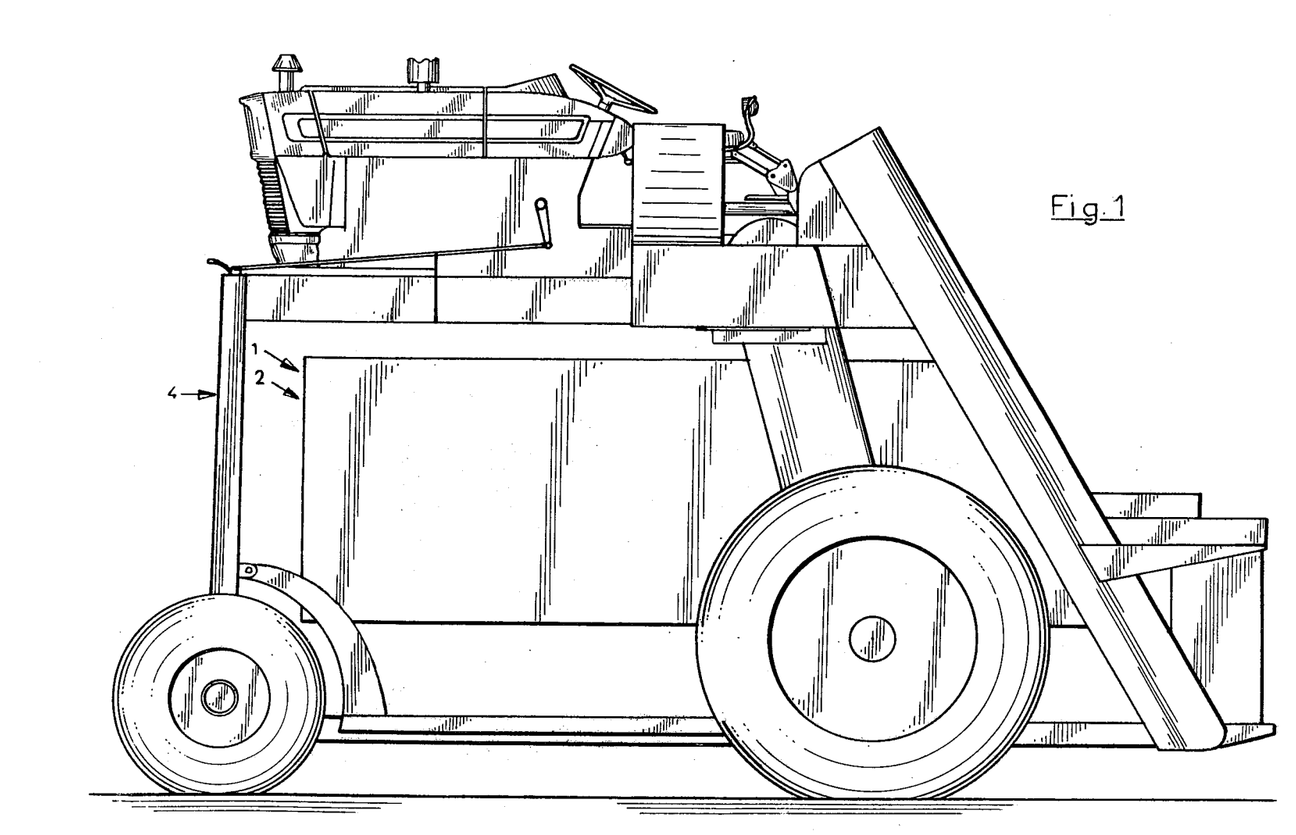
FIG. 1 is a diagrammatic side elevation of a grape-gathering machine to which a beating device according to the invention can be fitted.
Figure 2:
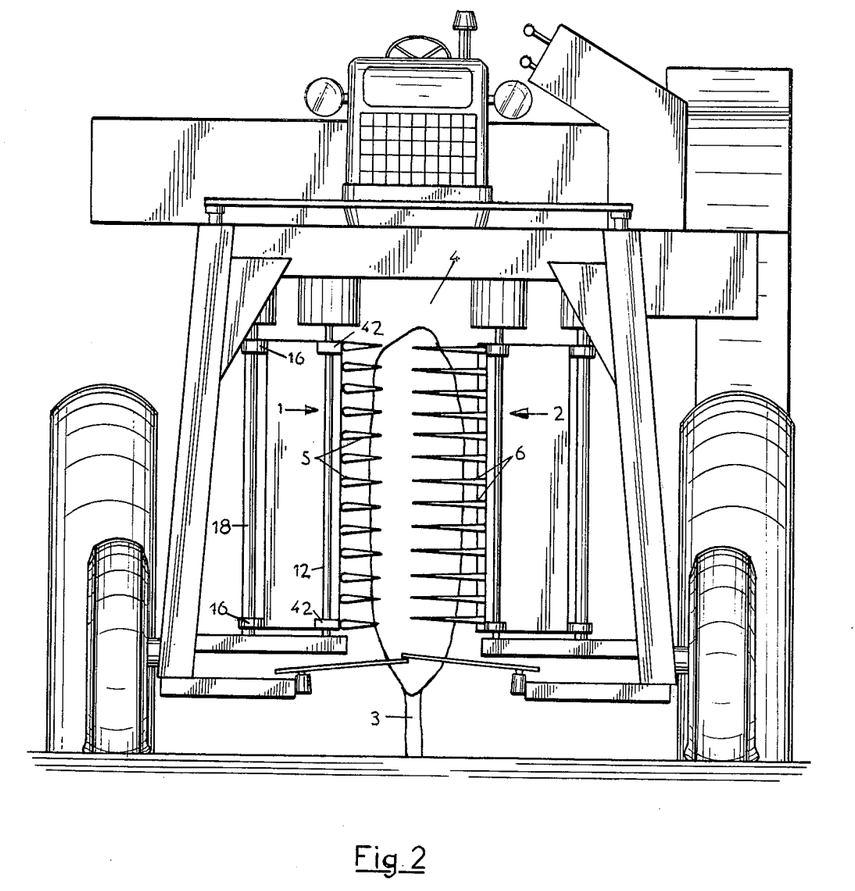
FIG. 2 is a front view of the machine illustrated in FIG. 1.

FIGS. 1 and 2 show a grape-gathering machine of a known type. On such a machine, the motion of the beaters 5 and 6, disposed on either side of the row of vine stocks 3, is modified by fitting beating mechanisms 1 and 2 according to the invention. For instance, said machine includes only one tunnel or channel 4 on the outside of said row of vine stocks 3. Inside said channel the beaters 5 and 6 are imparted a transverse motion with transmits an acceleration and a speed to the plants; the speed gained by the grapes generates a tearing force when one of the beaters stops the plant accelerated by the opposite beater.

Figure 3:
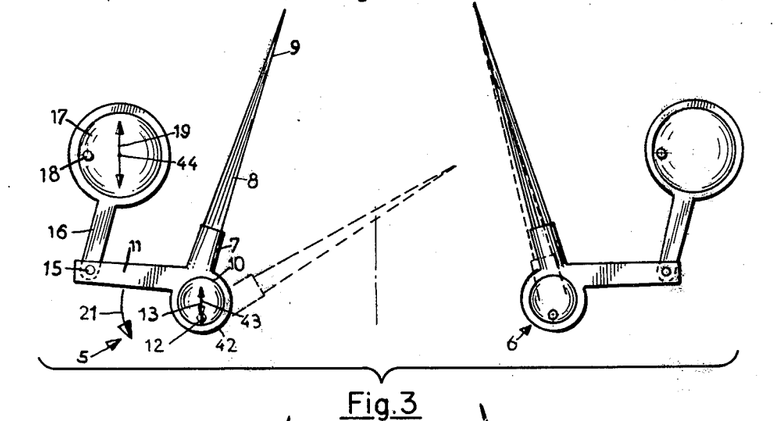
FIGS. 3 to 7 illustrate the transverse motion of two beaters opposite to each other, which are symmetrical with respect to a row of vines.

A beater 5 includes a vertical whip-carrying plate 7, to which the rear ends of rods 8 are fixed, said rods or whips 8 being horizontal, flexible, and tapering, and having their front ends or points 9 unsupported. The whip-carrying plate 7 is integral with a crankpin 42 inside which a first eccentric 10 rotates, said eccentric being integral with a vertical spindle 12. The plate 7 is, also connected to a lever 11 linked by a pin 15 to the small end of a connecting rod 16. A second eccentric 17 integral with a vertical rotary spindle 18 runs inside the big end of said connecting rod 16 (FIG. 3). An identical device is oppositely mounted on the other side of the row of vine stocks. Known systems (not shown) ensure the rotation of the eccentrics 10 and 17 and the vertical off-set spindles 12 and 18, respectively, in a manner such that the angular speed of the eccentric 10 is twice the angular speed of the eccentric 17, said rotation being in the same direction (clockwise, for instance). The rotation of the eccentric 17 with the vertical spindle 18 imparts to the big end of the connecting rod 16 a translatory motion along an arcuate path. The amplitude 19 of said translation in a direction parallel to the row of vine stocks is equal to twice the distance between the vertical spindle 18 and the centre 44 of the big end of the connecting rod. Said amplitude represents the maximum longitudinal stroke of the big end of the connecting rod, said stroke being effected while the eccentric performs a rotation by 180°.

The longitudinal stroke 13 of the crankpin 42 is one half that of first eccentric 10. The motion of the opposite beater is ensured through a rotation of the ecentrics in a reverse direction (arrows 21 and 22, FIG. 3).

Figure 4:
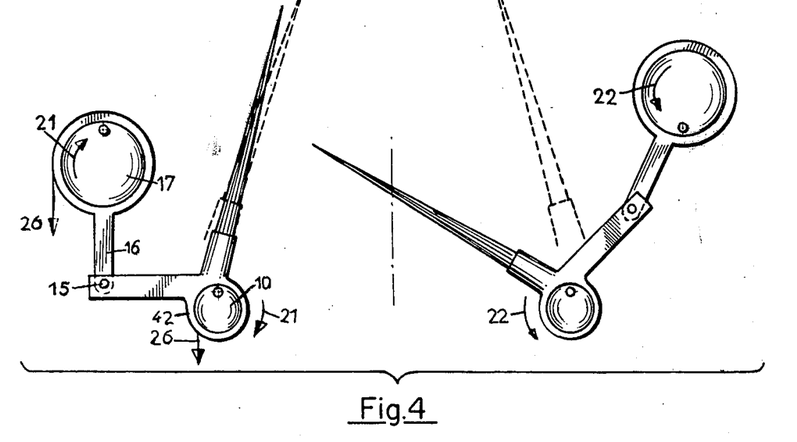
Figure 5:
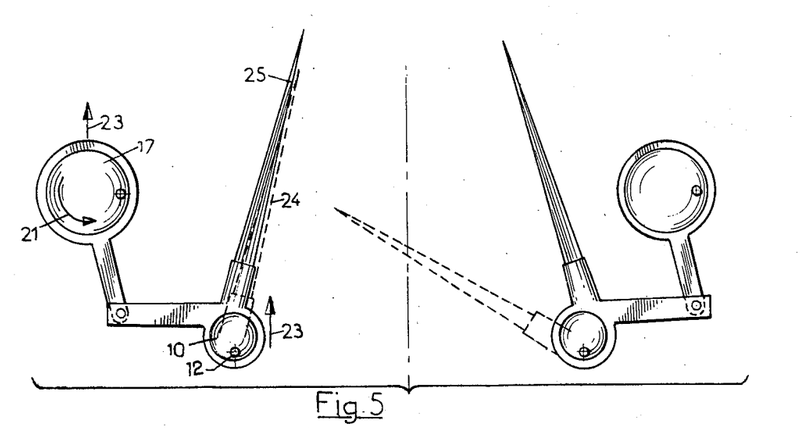
Figure 6:
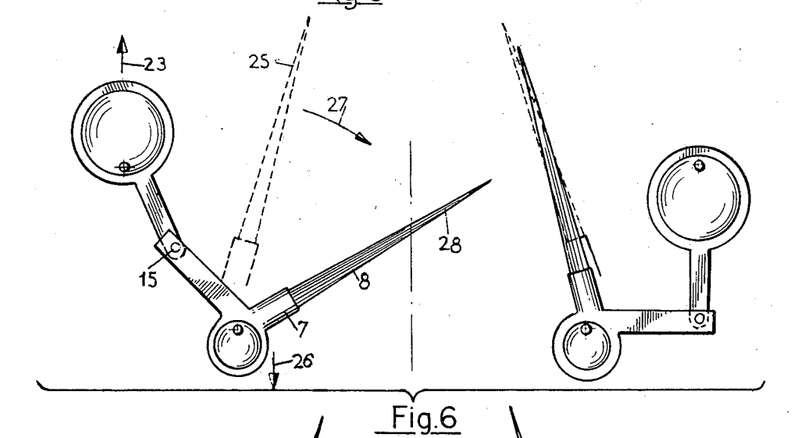
Figure 7:
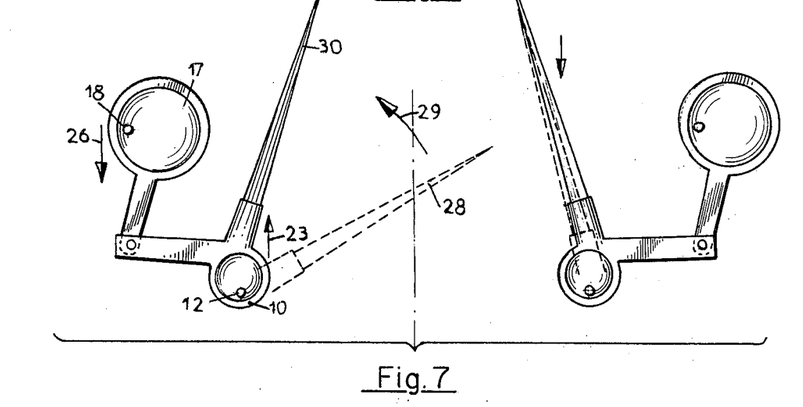

This arrangement makes it possible to actuate the whip-carrying plate 7 from the starting position as shown in FIG. 3. The combination of the speeds of displacement and of the length of the strokes of the eccentrics during a cycle allows the plates 7, and, therefore, the whips 8 to operate, according to the four following stages:

a. at the beginning of the motion (FIG. 4), the beater is at rest. The eccentrics 17 and 10 drive the connecting rod 16 and the lever 11 in the same direction, parallel to the vine stocks (arrow 23), by the same length, which is equal to half the longirudinal stroke of the eccentric 17, that is, the whole stroke of the eccentric 10. The beater 7 undergoes a translation and passes from the initial position 24 to the final position 25 (FIG. 5).

b. from the time illustrated in FIG. 5, the boss of the rotating eccentric 10 drives the crank-pin 42 in the opposite direction, and the plate 7 has its direction modified, while the big end of the connecting rod 16 proceeds in the same direction as in the previous stage (arrows 23 and 26, FIG. 6). The beater 5 comes closer to the vine stocks with a maximum acceleration (arrow 27): it passes from the initial position 25 to the final position 28 (FIG. 6) while acting as an accelerator.

c. during the third stage, the crank-pin 42 and the big end of the connecting rod 16 undergo translations reverse to that which they were undergoing in the previous stage. The beater 8 moves quickly away from the foliage in the direction of the arrow 29. It passes from the initial position 28 to the final position as shown in FIG. 7.

d. during the fourth stage of the cycle, the crank-pin and the connecting rod move by the same length, in the same direction 26. The beater undergoes a new translation, without any rotation. It acts then as a stopper towards the opposite beater which is now the accelerator (FIG. 4).

Figure 8:
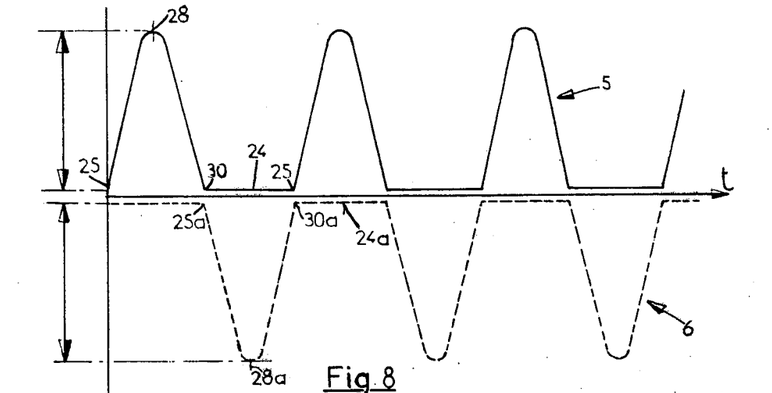
FIG. 8 is a graph showing the motions of the beaters, and the difference in step of said motions.

Each beater acts in combination with an opposite beater which is subjected to the same motions from the same mechanism. The amplitude and the period of the transverse motions of a beater 5 and an opposite beater 6 are illustrated in full lines and in broken lines, respectively, in FIG. 8. Said Figure shows the symmetry of the system and the difference in phase of the motions, said difference ensuring a variation in the spacing between the points of the beaters. The various positions 25, 28, 30 and 24 are shown in the graph of the motion of the beater 5. The corresponding positions of the beater 6 are out of step by half a period (25a, 28a, 30a, 24a).

Figure 9:
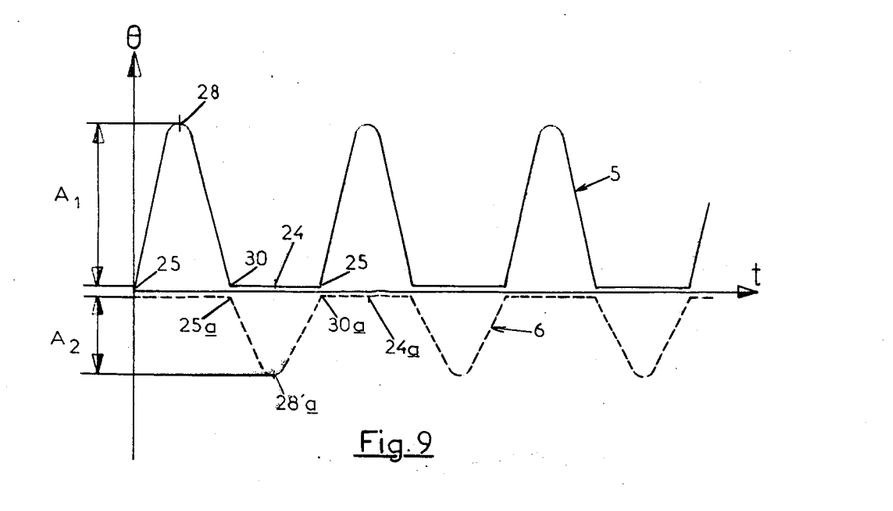
FIG. 9 is a graph showing the difference in step of two beaters mounted asymmetrically.
Figure 10:
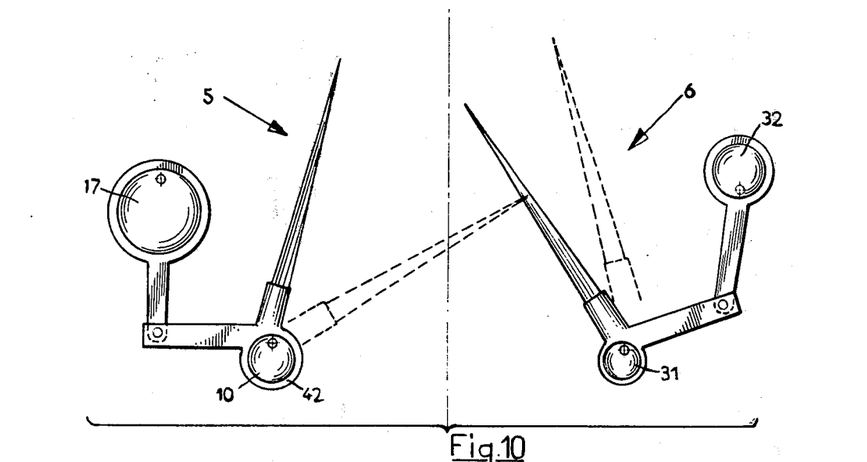
FIG. 10 shows the mounting of the beaters performing the motions illustrated in FIG. 9.

FIGS. 9 and 10 illustrate a beating device, the motions of which are asymmetrical. Here, the ratios of the eccentricities and the speeds of rotation of the eccentrics of the beater 5 remain the same as those of the eccentrics of the beater 6, that is, in a ratio equal to one to one half. However, the beater 5 acts preponderantly as an accelerator beater, while the beater 6 acts preponderantly as a stopper beater. To this end, in the direction parallel to the row of vines, the strokes of the eccentrics 31 and 32 of the stopper 6 are less than the strokes of the eccentrics 10 and 17 of the accelerator 5, so that the amplitude L1 of the transverse motion of 6 is lower than the amplitude L2 of the transverse motion of 5, as shown in the graph of FIG. 9.

Figure 11:
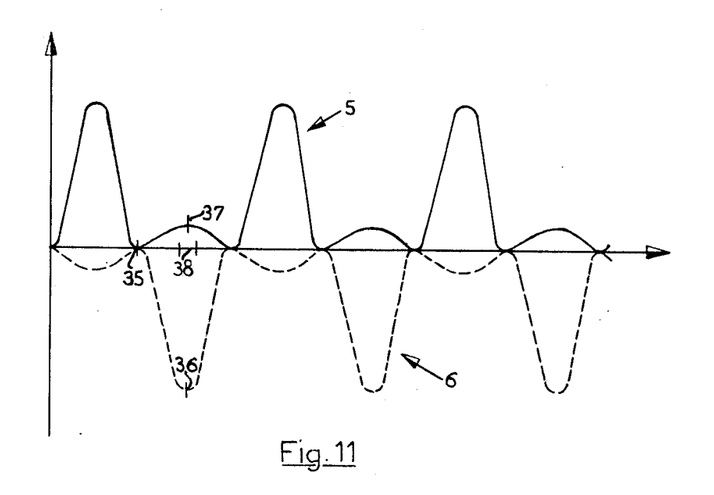
FIG. 11 is a graph showing the motions of the two symmetrical beaters, and the difference in step of said motions.
Figure 12:
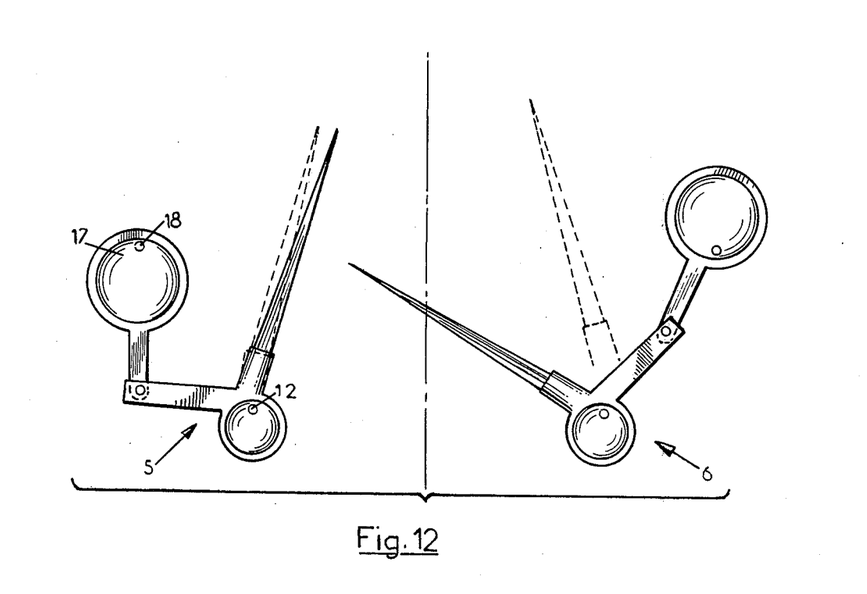
FIG. 12 is a fragmentary view of symmetrical embodiment for obtaining the motions illustrated on FIG. 11.

FIG. 12 shows symmetrical beaters which pivot about eccentrics arranged in a manner such that the stroke of the larger one is slightly lower than twice the stroke of the smaller one. The beaters 5 and 6 are still out of step with each other by half a period. Moreover, their translatory motion is accompanied by a slight rotation, as shown on the graph in FIG. 11.

During the accelerating motion of the beater 6, that is, between the points 35 and 36 of the curve in broken lines in FIG. 11, the stopper beaters 5 are imparted a slight rotation which brings them back towards the beaters 6 (which path is illustrated by the full line 35–37). During a very short time, illustrated by the area 38 (FIG. 11), the spacing between the opposed points is very narrow. When the beaters 5 and 6 are moved apart, the rotation accompanying the translation increases said spacing (FIG. 11).

Figure 13:
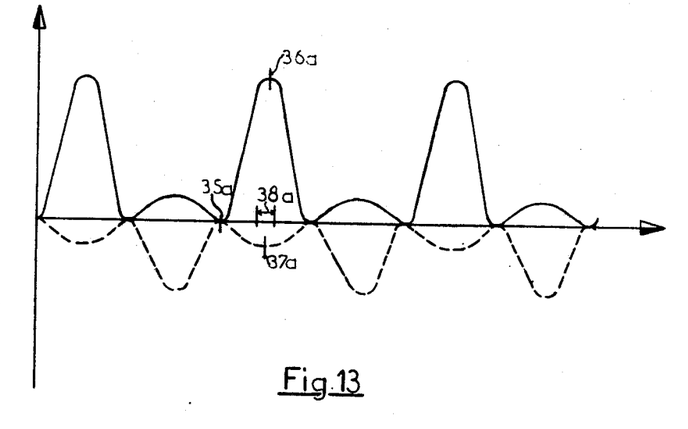
FIG. 13 is a graph showing the motions of two opposite asymmetrical beaters, and the difference in step of said motions.
Figure 14:
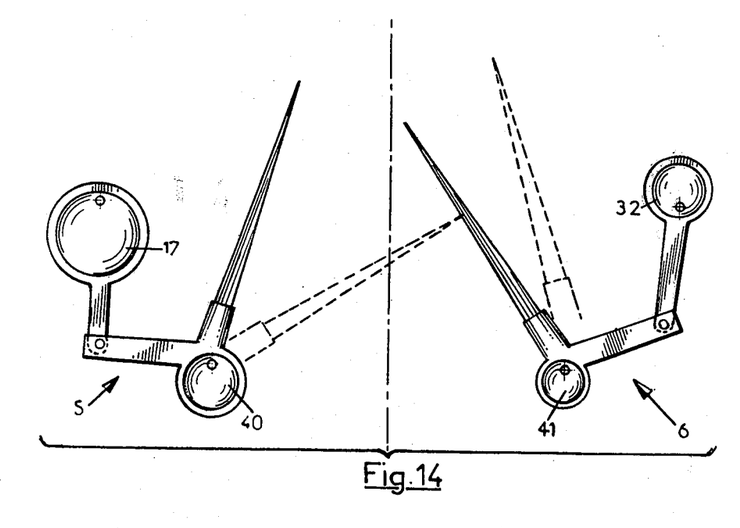
FIG. 14 is a fragmentary view of asymmetrical embodiment for obtaining the motions illustrated on FIG. 13.

FIGS. 13 and 14 illustrate an asymmetrical beating system. The accelerator beaters 5 are imparted a transverse motion the amplitude of which is higher than that of the motion of the stopper beaters 6. The eccentrics 17 and 32 are combined with eccentrics 40 and 41, respectively. The longitudinal stroke of 40 is slightly greater than half the longitudinal stroke of 17, and so is the ratio between the strokes of 41 and 32. A motion is thus obtained during which the translation of the beaters is accompanied by a slight rotation which facilitates the opening of the spacing between points, on the one hand, when the machines moves forward, and the impact at the time the clusters of grapes are accelerated on the other hand.

It will be noted that, in all cases, each beater has the same period of motion as the beater opposite it. The various modifications act only on the preferential or not preferential function of the beaters in a row, and on the shape of the motions thereof.

Any known structure may be utilized to drive the eccentrics, such as the hydraulic system shown in applicant's copending application Ser. No. 368,787. This drive structure per se forms no part of this invention.

This double cam mechanism allows, during the operation of the grape-gathering machine, varying the spacing between the points of the beating whips, with a minimum spacing obtained at the time the motion is ending, that is, when a reduction of said spacing is essential for tearing off the grapes. During the remainder of the motion, the spacing between two opposite beaters is higher than that obtained by means of the conventional devices.

I claim:

1. In a mobile grape gathering machine of the type wherein a generally inverted U-shaped structure passes over at least one row of vine stocks, said structure having at least two beating devices with a plurality of flexible rods emanating therefrom to beat or shake the vine stocks to remove the graps therefrom, mounted within said said inverted U-shape, the improvement wherein each beater mechanism comprises:

a. a rod carrying plate to which is affixed one end of each of the plurality of flexible rods, said rod carrying plate having an integral crank pin extension with a first circular opening therethrough, b. a lever having a first end rigidly affixed to said rod carrying plate and a second end, c. a connecting rod having a first end pivotally attached to said second end of said lever, and a second end having an integral enlarged portion with a second circular opening therethrough, d. a first spindle pivotally attached to said inverted U-shaped structure, e. a first eccentric rigidly affixed to said first spindle and rotatably mounted within said first circular opening, f. a second spindle pivotally attached to said inverted U-shaped structure, g. a second eccentric rotatably mounted within said second circular opening, and h. means to rotate said first and second eccentrics, in the same direction to cause said rod carrying plate to translate along a curved path with respect to said U-shaped structure.

2. The improved beater mechanism of claim 1 wherein the diameters of the first and second eccentrics of one beating device are less than the diameters of the corresponding eccentrics of the other beating device.

3. The improved beating mechanism of claim 1 wherein the first eccentric is rotated at twice the speed of said second eccentric.

4. The improved beating mechanism of claim 3 wherein the eccentricity of said first eccentric is one half the eccentricity of said second eccentric.

* * * * *